(12) United States Patent
Davis

(10) Patent No.: US 8,727,009 B2
(45) Date of Patent: May 20, 2014

(54) SURFACE SIGNAL FOR FLOW BLOCKAGE FOR A SUBTERRANEAN DEBRIS COLLECTION APPARATUS

(75) Inventor: John P. Davis, Cypress, TX (US)

(73) Assignee: Baker Hughes Incorporated, Houston, TX (US)

( * ) Notice: Subject to any disclaimer, the term of this patent is extended or adjusted under 35 U.S.C. 154(b) by 700 days.

(21) Appl. No.: 12/975,657

(22) Filed: Dec. 22, 2010

(65) Prior Publication Data

US 2012/0160503 A1 Jun. 28, 2012

(51) Int. Cl.
*E21B 34/00* (2006.01)

(52) U.S. Cl.
USPC .......... 166/312; 166/99; 166/319; 166/332.1; 166/105.2

(58) Field of Classification Search
CPC .............................. E21B 27/04; E21B 27/005
USPC ........ 166/99, 312, 319, 332.1, 105.2, 205.04; 137/499; 175/172
See application file for complete search history.

(56) References Cited

U.S. PATENT DOCUMENTS

| | | | |
|---|---|---|---|
| 6,276,452 B1 | 8/2001 | Davis et al. | |
| 7,472,745 B2 * | 1/2009 | Lynde et al. | 166/99 |
| 2002/0053428 A1 | 5/2002 | Maples | |
| 2009/0032247 A1 | 2/2009 | Davis | |
| 2010/0243258 A1 | 9/2010 | Fishbeck et al. | |
| 2010/0288492 A1 | 11/2010 | Blackman et al. | |

* cited by examiner

*Primary Examiner* — Jennifer H Gay
*Assistant Examiner* — George Gray
(74) *Attorney, Agent, or Firm* — Steve Rosenblatt

(57) ABSTRACT

The debris collection device operates on an eductor principle with motive fluid delivered from the surface into an eductor housing inlet. The eductor outlet goes into a surrounding annular space and splits with some flow going to the mill below to direct cuttings into the passage in the housing. The cuttings remain in the housing and the flow continues through a screen in the housing passage before reaching the eductor inlet. An auxiliary inlet is normally closed and opened with a reduced flow entering through the mill. The opening of the auxiliary inlet drops the surface pressure delivered to the eductor to act as a surface signal that a plugged or low debris laden inlet flow exists.

20 Claims, 4 Drawing Sheets

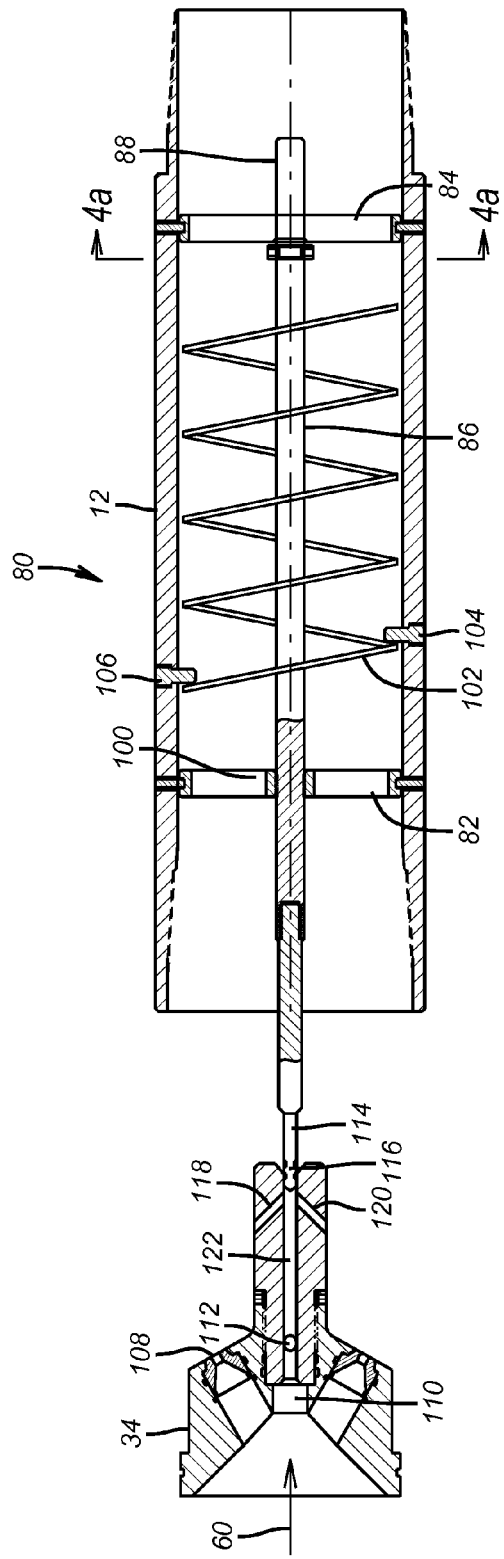
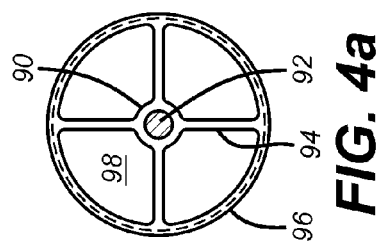
FIG. 4
FIG. 4a

SURFACE SIGNAL FOR FLOW BLOCKAGE FOR A SUBTERRANEAN DEBRIS COLLECTION APPARATUS

FIELD OF THE INVENTION

The field of the invention is debris collection devices for subterranean use and more particularly debris collection devices that use an eductor principle to draw debris laden fluid into a lower end using exhausted eductor fluid where a feature of a surface signal is added to indicate a low flow or blockage condition in the apparatus.

BACKGROUND OF THE INVENTION

When a metal object, such as a section of casing, a packer, or a lost tool, is to be removed from a well bore, the best method of removal is often to mill the object into small cuttings with a mill such as a pilot mill, a section mill, or a junk mill, and then to remove the cuttings from the well bore. Furthermore, a milling tool will often result in the removal of scale, cement, or formation debris from a hole.

It is important to remove the cuttings, or other debris, because other equipment subsequently used in the well bore may incorporate sealing surfaces or elastomers, which could be damaged by loose metal cuttings being left in the hole. Most commonly, the metal cuttings and other debris created by milling are removed from the well bore by circulating fluid down the inside of the workstring and out openings in the milling tool, then up the annulus to the surface of the well site. This "forward circulation" method usually leaves some cuttings or debris stuck to the side of the well casing or well bore surface, and these cuttings or debris can damage some of the tools which may subsequently be run into the hole. Also, safety devices such as blow-out preventers usually have numerous cavities and crevices in which the cuttings can become stuck, thereby detracting from the performance of the device or possibly even preventing its operation. Removal and clean-out of such safety devices can be extremely expensive, often costing a quarter of a million dollars or more in the case of a deep sea rig. Further, rapid flow of debris-laden fluid through the casing can even damage the casing surface. Nevertheless, in applications where a large amount of metal must be removed, it is usually necessary to mill at a relatively fast rate, such as 15 to 30 feet of casing per hour. These applications call for the generation of relatively large cuttings, and these cuttings must be removed by the aforementioned method of "forward circulation", carrying the metal cuttings up to the well site surface via the annulus. In some applications, such as preparation for the drilling of multiple lateral well bores from a central well bore, it is only necessary to remove a relatively short length of casing from the central bore, in the range of 5 to 30 feet. In these applications, the milling can be done at a relatively slow rate, generating a somewhat limited amount of relatively small cuttings. In these applications where a relatively small amount of relatively small cuttings are generated, it is possible to consider removal of the cuttings by trapping them within the bottom hole assembly, followed by pulling the bottom hole assembly after completion of the milling operation. The advantage of doing so is that the cuttings are prevented from becoming stuck in the well bore or in a blow-out preventer, so the risk of damage to equipment is avoided.

Some equipment, such as the Baker Oil Tools combination ball type Jet and junk basket, product number 130-97, rely upon reverse circulation to draw large pieces of junk into a downhole junk removal tool. This product has a series of movable fingers which are deflected by the junk brought into the basket, and which then catch the larger pieces of junk. An eductor jet induces flow into the bottom of the junk basket. This tool is typical, in that it is generally designed to catch larger pieces of junk which have been left in the hole. It is not effective at removing small debris, because it will generally allow small debris to pass back out through the basket.

Moreover, the ability of this tool to pick up debris is limited by the fluid flow rate which can be achieved through the workstring, from a pump at the well site. In applications where the tool must first pass through a restricted diameter bore, to subsequently operate in a larger diameter bore, the effectiveness of the tool is severely limited by the available fluid flow rate. Additionally, if circulation is stopped, small debris can settle behind the deflecting fingers, thus preventing them from opening all the way. Further, if this tool were to be run into a hole to remove small cuttings after a milling operation, the small cuttings would have settled to the bottom of the hole, making their removal more difficult. In fact, this tool is provided with coring blades for coring into the bottom of the hole, in order to pick up items which have settled to the bottom of the hole.

Another type of product, such as the combination of a Baker Oil Tools jet bushing, product number 130-96, and an internal boot basket, product number 130-21, uses a jet action to induce fluid flow into the tool laden with small debris. The internal boot basket creates a circuitous path for the fluid, causing the debris to drop out and get caught on internal plates. An internal screen is also provided to further strip debris from the fluid exiting the tool. The exiting fluid is drawn by the jet back into the annulus surrounding the tool. However, here as before, if this tool were to be run into a hole to remove small cuttings after a milling operation, the small cuttings would have settled to the bottom of the hole, making their removal more difficult. Furthermore, here again, the ability of this tool to pick up debris is limited by the fluid flow rate which can be achieved through the workstring.

Another known design is represented by the Baker Oil Tools Model M reverse circulating tool, which employs a packoff cup seal to close off the wellbore between fluid supply exit ports and return fluid exit ports. A reverse circulating flow is created by fluid supply exit ports introducing fluid into the annulus below the packoff cup seal, which causes fluid flow into the bottom of an attached milling or washover tool. This brings fluid laden with debris into the central bore of the reverse circulating tool, to be trapped within the body of the tool. The reverse circulating fluid exits the body of the tool through return fluid exit ports above the packoff cup seal and flows to the surface of the well site via the annulus. This tool relies upon the separation of the supply fluid and the return fluid, by use of the packoff cup seal between the fluid supply exit ports and return fluid exit ports. To avoid damage to this cup during rotation of the tool, the packoff cup seal must be built on a bearing assembly, adding significantly to the cost of the tool. Additionally, here as before, the ability of this tool to pick up debris is limited by the fluid flow rate which can be achieved through the workstring.

As shown in FIGS. 1 and 2, originally in U.S. Pat. No. 6,276,452, a rotating tool 8 has a drive sub 10 at its upper end, a plurality of sections of wash pipe 12, 16, 18 connected to the drive sub 10, a screen crossover 14 and a triple connection sub 20 connected to the wash pipe, and a milling tool 22 connected to the lower end of the triple connection sub 20. The drive sub 10 is adapted to connect to a rotating workstring (not shown) or to a downhole motor (not shown) connected to a non-rotating workstring, such as coiled tubing, by means such as a threaded connection. The sections of wash pipe 12, 16, 18, the screen crossover sub 14, and the triple connection sub 20 serve as a separator housing. The uppermost wash pipe ejection port section 12, which is threaded to the drive sub 10, incorporates a plurality of supply fluid exit or ejection ports 24 penetrating the wall of the wash pipe section 12 at spaced intervals. The screen crossover sub 14, which is threaded to the ejection port section 12, serves to hold a tubular filter screen 32 in place below the ejection ports 24, with the screen 32 extending downwardly toward the milling tool 22 at the lower end of the apparatus. A first wash pipe extension section 16 can be threaded to the screen crossover sub 14, if necessitated by the length of the screen 32. A second wash pipe extension section 18 is threaded to the first extension section 16. The triple connection sub 20 is threaded to the lower end of the second extension section 18.

The milling tool 22 is threaded to the lower end of the triple connection sub 20. A plurality of blades 23 are positioned at intervals about the periphery of the milling tool 22 for milling metal items, such as casing or liner pipe, from the well bore. The lower end of the milling tool 22 can have a drift plate 25, which has a diameter close to the inside diameter of the bore hole in which the milling tool 22 will be used. The drift plate 25 serves to prevent metal cuttings from falling down the bore hole. One or more intake slots or ports 26 are provided in the lower end of the milling tool 22 below the blades 23. In applications where the stuck pipe is not concentrically positioned in the casing or well bore, it has been found that the drift plate 25 can break loose, so in such applications, a milling tool 22 without the drift plate 25 is used, and a single intake port is located at the bottom of the milling tool 22, instead of a plurality of slots 26.

Importantly, a debris deflector tube 28 is threaded into an interior thread in the triple connection sub 20, extending upwardly from the triple connection sub 20 toward the screen 32. A plurality of side ports 30 are provided through the wall of the deflector tube 28. A deflector plate 31 is provided in the upper end of the deflector tube 28 to deflect any metal cuttings or other debris which might be carried by fluid flowing through the deflector tube 28, and to separate the debris from the fluid. Alternatively, other means of separating the debris from the fluid can be used, such as deflection plates within the deflector tube 28 to create a spiral fluid flow, thereby separating the heavy debris from the fluid.

Another important feature of the deflector tube 28 is that its reduced diameter facilitates movement of the cuttings along with the fluid, up to the point of separation of the cuttings from the fluid for deposit in a holding area. In a representative example, the body of the tool might have a nominal diameter of 7 5/8 inches, with the deflector tube 28 having a nominal diameter of 2 3/8 inches. It has been found that a fluid flow velocity of approximately 120 feet per minute is required to keep the cuttings moving along with the fluid, depending upon the fluid formulation. This flow velocity can be achieved in the exemplary deflector tube 28 with a fluid flow rate of only about ½ barrel per minute. If a reverse circulation tool without the deflector tube 28 were employed, a fluid flow rate of about 6 barrels per minute would be required to keep the cuttings moving. Put another way, if a reverse circulation tool were not used, with forward circulation instead being relied upon to move the cuttings all the way to the surface via the annulus, a fluid flow rate of 4 to 10 barrels per minute, or even more, would be required. This means that use of the tool of FIGS. 1 and 2 allows the use of smaller pumps and motors at the well site surface, and use of cheaper formulations of fluid.

In FIG. 1, a plurality of high speed supply fluid eductor nozzles 34 are provided in the wash pipe ejection port section 12, with each eductor nozzle 34 being aligned with one of the ejection ports 24, at a downward angle. As the tool 8 is rotated to mill away the metal item from the well bore with the milling tool 22, fluid is pumped by a pump (not shown) at the surface of the well site down through the workstring (not shown). The fluid flows from the workstring through the drive sub 10, and then through the eductor nozzles 34. Since the eductor nozzles 34 have restricted flow paths, they create a high speed flow of fluid, which is then directed downwardly through the ejection ports 24. As the high speed fluid flows out of the eductor nozzles 34 and through the ejection ports 24, it creates an area of low pressure, or vacuum, in the vicinity of the eductor nozzles 34, within the ejection port section 12 of the separator housing.

This area of low pressure or vacuum in the ejection port section 12 draws fluid up through the intake ports 26 of the milling tool 22, through the deflector tube 28, and through the screen 32. The fluid thusly drawn upwardly then passes out through the ejection ports 24 to the annulus surrounding the separator housing, to flow downwardly toward the milling tool 22. Excess fluid supplied via the workstring can also flow upwardly through the annulus toward the surface of the well site, to return to the pump.

As fluid flows past the milling tool blades 23, it entrains small cuttings or debris generated as the blades mill away the casing or other metal item. This debris-laden fluid then enters the intake ports 26 at the lower end of the milling tool 22 and passes into the interior of the deflector tube 28 within the wash pipe extension section 18. As the debris-laden fluid exits the side ports 30 in the deflector tube 28, the debris, which is heavier than the fluid, tends to separate from the fluid and settle into an annular area 56 between the deflector tube 28 and the wash pipe extension section 18.

The fluid, which may still contain very fine debris, then flows upwardly to contact the inlet side of the screen 32. As the fluid flows through the screen 32, the fine debris is removed by the screen 32, remaining for the most part on the inlet side of the screen 32. Fluid leaving the outlet side of the screen 32 then flows upwardly to the area of low pressure, or vacuum, in the vicinity of the eductor nozzles 34.

This eductor nozzle of FIGS. 1 and 2 will create a sufficient flow velocity to entrain virtually all of the small debris generated by the milling tool 22. In fact, it has been found that a 7 and 5/8 inch tool according to the first embodiment creates a sufficient flushing action to remove the cutting debris from a milling operation within a 30 inch casing.

FIG. 3 illustrates the flow scheme in the device of FIGS. 1 and 2. Arrow 60 represents the pumped flow of clean fluid from the surface. That flow enters ports 34 and exits from ports 24 at an angle to the longitudinal axis of the tool as represented by arrow 62. Upon making the exit there is impingement against the surrounding tubular 64 as some flow goes uphole as shown by arrow 66 and some goes downhole as shown by arrow 68. The result is induced flow through the tool as indicated by arrow 70. The induced flow is also boosted by the flow represented by arrows 68 heading downhole and into the lower end of the mill assembly 22. The cuttings from the milled object 72 enter inlet 26 and mostly settle into the annular volume 56 around the inlet tube 28.

The problem is that if there is a clog of debris entering the lower end of the tool as represented by arrow 68 there has not been a reliable way that surface personnel can know that such a condition exists. As a result no debris may be collected and the impaired circulation can adversely affect the mill causing it to fail. The present invention allows a surface indication of low or no debris inlet flow so that the bottom hole assembly can be pulled and cleaned out when needed. Those skilled in the art will further appreciate additional details of the invention from a review of the description of the preferred embodiment and the associated drawings while realizing that the full scope of the invention is to be found in the appended claims.

SUMMARY OF THE INVENTION

The debris collection device operates on an eductor principle with motive fluid delivered from the surface into an eductor housing inlet. The eductor outlet goes into a surrounding annular space and splits with some flow going to the mill below to direct cuttings into the passage in the housing. The cuttings remain in the housing and the flow continues through a screen in the housing passage before reaching the eductor inlet. An auxiliary inlet is normally closed and opened with a reduced flow entering through the mill. The opening of the auxiliary inlet drops the surface pressure delivered to the eductor to act as a surface signal that a plugged or low debris laden inlet flow exists.

BRIEF DESCRIPTION OF THE DRAWINGS

FIG. 4 is a section view showing the valve for the auxiliary inlet that is inside the eductor housing in the open position;
FIG. 4a is a section view along line 4a-4a of FIG. 4.

DETAILED DESCRIPTION OF THE PREFERRED EMBODIMENT

Figure 1:
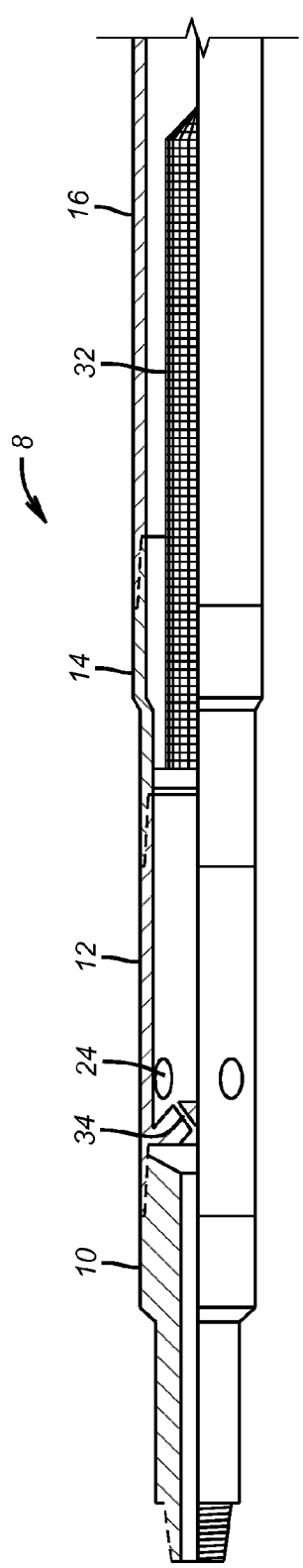
FIG. 1 is a section view of the upper end of a debris removal tool of the prior art.
Figure 2:
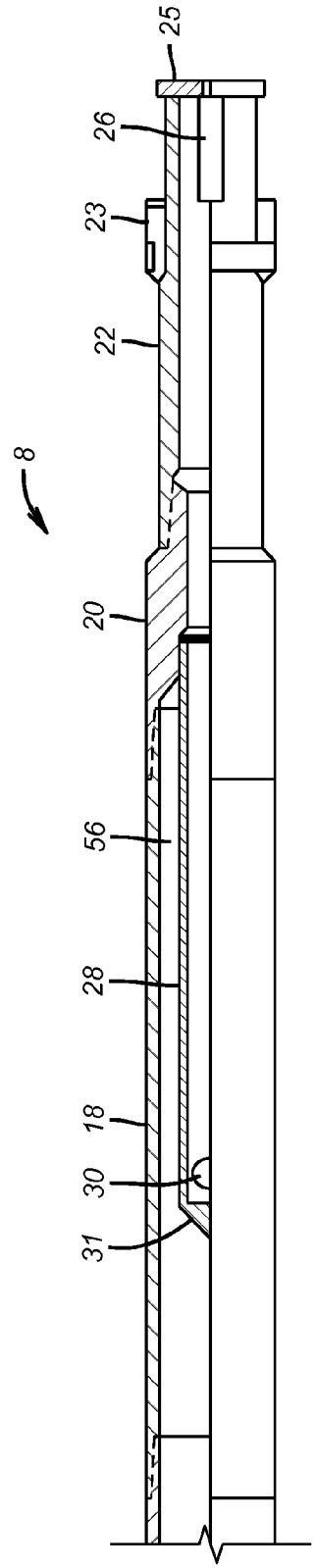
FIG. 2 is a section view of the lower end of the tool shown in FIG. 1.
Figure 3:
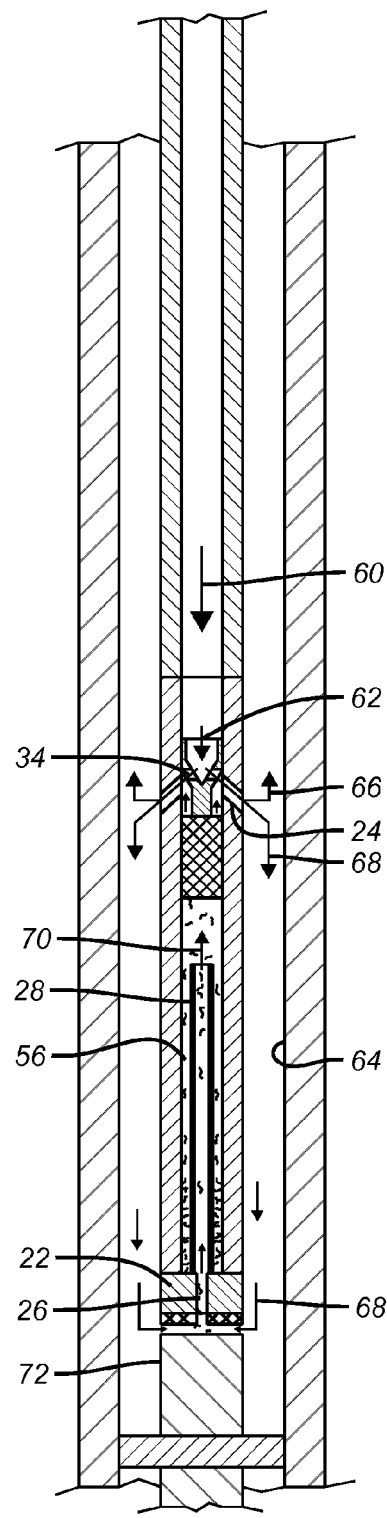
FIG. 3 is a circulation diagram of the flows in the tool of FIGS. 1 and 2.

Referring to FIG. 4 the housing 12 is preferably above the screen 34 shown in FIGS. 1 and 3. The eductor assembly 34 is shown above the housing 12. Spaced supports 82 and 84 have a circular periphery 96 and a series of spokes 94 leading to a hub 90 with an opening 92. A series of passages 98 allow fluid to flow past the supports 82 and 84. The supports 82 and 84 are identical except that support 82 has a threaded connection 100 to shaft 86.

Shaft 86 has an auger 102 between supports 82 and 84. The shaft 86 has an upper end 114 that has a seal assembly 116 that can selectively block the passages 120 in path 122 that can have any orientation. The eductor assembly 34 receives pressurized fluid from the surface represented by arrow 60 at a motive fluid inlet. One or more outlet nozzles 108 direct fluid out through ports 24 shown in FIG. 1. The eductor assembly has an inlet passage 110 that allows flow from a main inlet 112 to be drawn in by the eductor assembly 34.

During normal operation, the debris laden flow represented by arrow 68 in FIG. 3 drops its debris into space 56 and then is filtered by screen 32 before reaching the auger 102 The shaft 86 can translate due to rotation caused by the flow turning the auger 102. The connection 100 converts rotation of shaft 86 into translation so that the lower end 88 of shaft 86 rises while staying inside the opening 92 and the upper end 114 of the shaft 86 rises to place the seal assembly 116 in the path of the auxiliary inlets 120 in path 122. Guides 104 and 106 guide the auger 102 as it turns under the influence of flow during normal operations. This keeps the openings 120 closed during normal operation and a pressure reading that is seen by surface personnel is used to gauge the normal condition of debris removal. Should flow represented by arrow 68 diminish or stop the driving force keeping auger 102 in the position of having ports 120 closed will decrease or disappear. When that happens the weight of the auger 102 or a return bias force (not shown) can cause the auger 102 to turn in the reverse direction so that the seal assembly 116 moves in passage 122 to open the inlets 120. This results in a noted decrease in observed pressure at the surface as a signal to surface personnel to stop the milling operation and to remove the bottom hole assembly and service the debris removal apparatus before any equipment is damaged.

Figure 5:
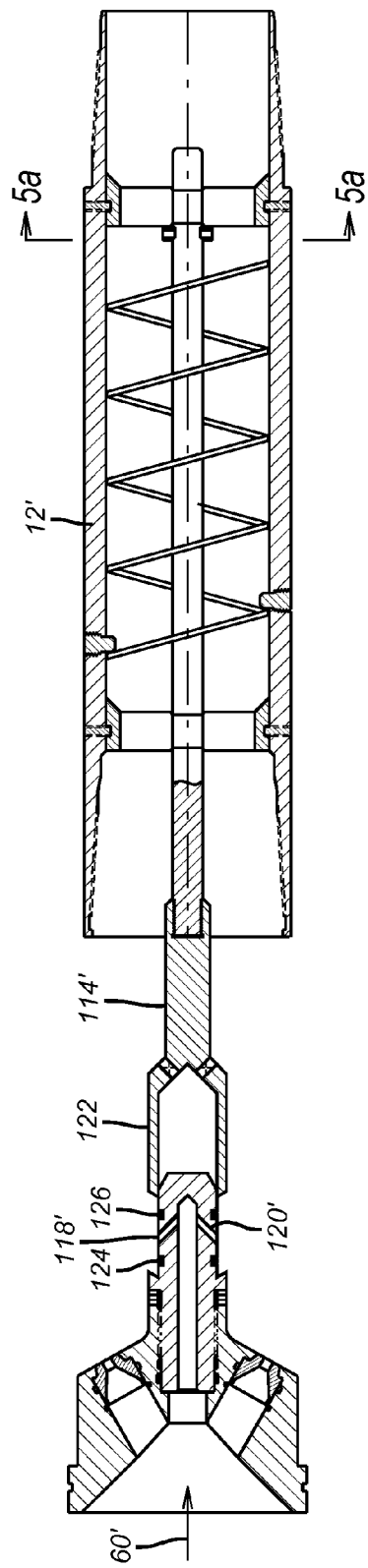
FIG. 5 is an alternative to FIG. 4 showing the auxiliary inlet valve positioned outside the eductor housing in the open position.
Figure 5A:
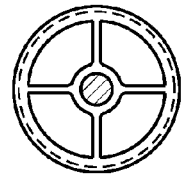
FIG. 5a shows the view along line 5a-5a of FIG. 5.

The FIG. 5 embodiment works the same way except that a sleeve 122 is now on the outside of the eductor assembly 34 to operate the auxiliary inlets 120'.

Those skilled in the art will appreciate that there is a simple device that operates on the debris laden flow into a housing to keep an auxiliary inlet to an eductor closed so that a normal operating pressure at the surface is established. If due to a clog the debris laden flow slows or stops the device opens the auxiliary inlet or inlets and the surface operating pressure drops due to the reduction in resistance to suction by the eductor. The surface personnel have a signal that the bottom hole assembly needs to be pulled. The auger is preferably located downstream from the screen 32 so that only the finest debris will go through the auger. The auger provides minimal pressure drop and its connection at 100 allows conversion of rotation that is induced by flow through the auger to translate a shaft that has the valve member to keep the auxiliary inlets closed during normal operation or to allow them to open with the weight of the auger and/or a bias force reversing the rotation direction of the auger so that the auxiliary ports can open for the surface pressure signal.

The auger creates a rotation in the shaft with minimal resistance to the flow therethrough along a spiral path.

The above description is illustrative of the preferred embodiment and many modifications may be made by those skilled in the art without departing from the invention whose scope is to be determined from the literal and equivalent scope of the claims below.

I claim:

1. A surface signal device for a subterranean debris removal tool, comprising:
a housing having a passage and a debris laden fluid inlet, said housing having a motive fluid pressure supplied from the surface to said passage that causes the debris laden fluid to enter said inlet when said passage is in a first configuration indicating predetermined pressure for said motive fluid at the surface;
a valve in said passage having a valve member responsive to change in debris laden fluid flowing into said inlet to reconfigure said passage by creating an additional inlet through which said motive fluid pressure can draw fluid into said passage upon reduction or loss of inlet fluid flow which causes a change in indicated pressure at the surface to signal the need for maintenance of the device.

2. The device of claim 1, wherein:
said valve member translates in response to flow into said inlet.

3. The device of claim 1, wherein:
said valve member rotates in response to flow into said inlet.

4. A surface signal device for a subterranean debris removal tool, comprising:
a housing having a passage and a debris laden fluid inlet, said housing having a motive fluid pressure supplied from the surface to said passage that causes the debris laden fluid to enter said inlet when said passage is in a first configuration indicating predetermined pressure for said motive fluid at the surface;

a valve in said passage having a valve member responsive to change in debris laden fluid flowing into said inlet to reconfigure said passage upon reduction or loss of inlet fluid flow which causes a change in indicated pressure at the surface to signal the need for maintenance of the device;

said valve member rotates in response to flow into said inlet;

said valve member comprises shaft supporting a member that defines a spiral flow path for fluid flowing into said inlet.

5. The device of claim 4, wherein:
said shaft comprises an auger.

6. The device of claim 5, wherein:
said shaft supported from at least one support that converts shaft rotation in a first direction into shaft translation that maintains said first configuration of said passage.

7. The device of claim 6, wherein:
a reduction of a predetermined rate or loss of flow into said inlet allows shaft rotation in a second direction opposed from said first direction aided by the weight of said auger.

8. The device of claim 6, wherein:
a reduction of a predetermined rate or loss of flow into said inlet allows shaft rotation in a second direction opposed from said first direction aided by a biasing member action on said auger.

9. A surface signal device for a subterranean debris removal tool, comprising:
a housing having a passage and a debris laden fluid inlet, said housing having a motive fluid pressure supplied from the surface to said passage that causes the debris laden fluid to enter said inlet when said passage is in a first configuration indicating predetermined pressure for said motive fluid at the surface;

a valve in said passage having a valve member responsive to change in debris laden fluid flowing into said inlet to reconfigure said passage upon reduction or loss of inlet fluid flow which causes a change in indicated pressure at the surface to signal the need for maintenance of the device;

said passage further comprises an eductor assembly receiving motive fluid from the surface and drawing in fluid that entered said inlet into a main eductor inlet;

said valve selectively operating at least one auxiliary eductor inlet for said reconfiguration of said passage from said first configuration.

10. The device of claim 9, wherein:
said valve is located internally of said eductor assembly.

11. The device of claim 9, wherein:
said valve is located on an exterior of said eductor assembly.

12. The device of claim 9, wherein:
said valve member translates in response to flow into said inlet.

13. The device of claim 9, wherein:
said valve member rotates in response to flow into said inlet.

14. The device of claim 13, wherein:
said valve member comprises a shaft supporting a member that defines a spiral flow path for fluid flowing into said inlet.

15. The device of claim 14, wherein:
said shaft comprises an auger.

16. The device of claim 15, wherein:
said shaft supported from at least one support that converts shaft rotation in a first direction into shaft translation that maintains said first configuration of said passage.

17. The device of claim 16, wherein:
a reduction of a predetermined rate or loss of flow into said inlet allows shaft rotation in a second direction opposed from said first direction aided by the weight of said auger.

18. The device of claim 16, wherein:
a reduction of a predetermined rate or loss of flow into said inlet allows shaft rotation in a second direction opposed from said first direction aided by a biasing member action on said auger.

19. The device of claim 16, wherein:
said auger located between spaced supports in said passage, said supports having flow passages therethrough.

20. The device of claim 19, wherein:
said supports are located between a screen in said passage and said eductor assembly.

\* \* \* \* \*